Sept. 4, 1923.　　　　　　　　　　　　　　　　　　　1,466,979
F. G. WHITTINGTON
POWER TRANSMITTING CONNECTIONS AND ADAPTER
Filed May 6, 1922
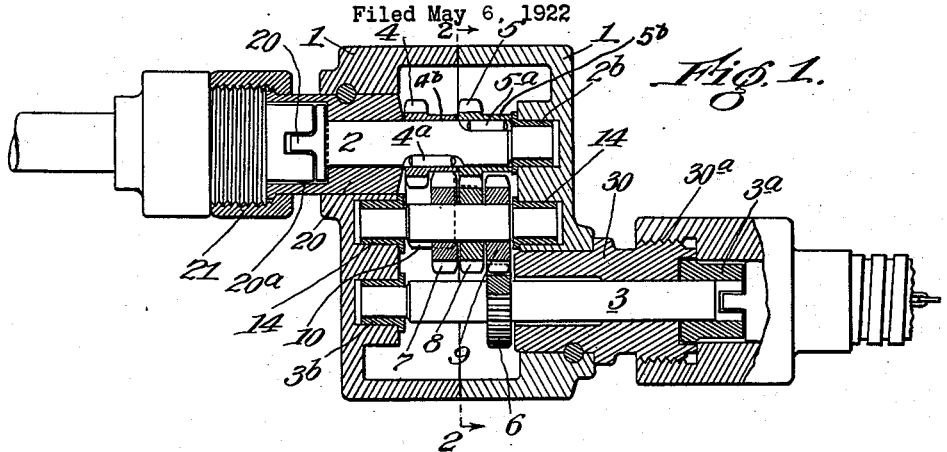
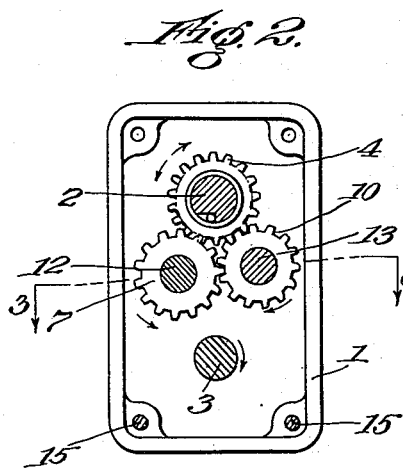
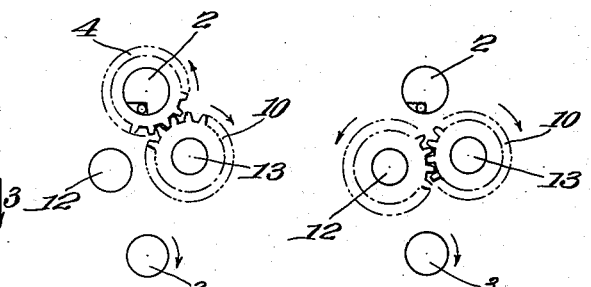
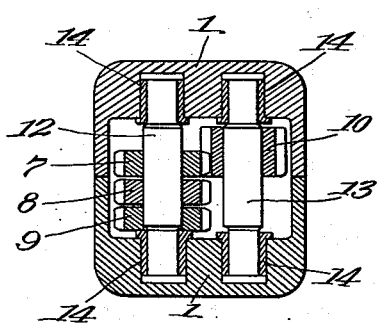
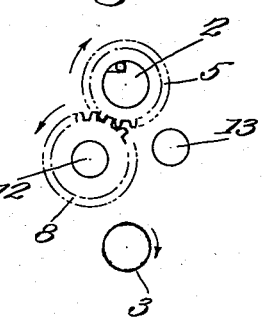
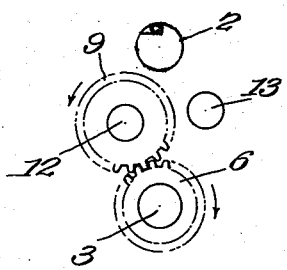
Inventor:
Fredrik G. Whittington.
By Burton & Burton,
his Attys.
Witness:
F. J. Gathmann Patented Sept. 4, 1923.

1,466,979

UNITED STATES PATENT OFFICE.

FREDERIK G. WHITTINGTON, OF EVANSTON, ILLINOIS, ASSIGNOR TO STEWART-WARNER SPEEDOMETER CORPORATION, OF CHICAGO, ILLINOIS, A CORPORATION OF VIRGINIA.

POWER-TRANSMITTING CONNECTIONS AND ADAPTER.

Application filed May 6, 1922. Serial No. 558,844.

*To all whom it may concern:*

Be it known that I, FREDERIK G. WHITTINGTON, a citizen of the United States, residing at Evanston, in the county of Cook and State of Illinois, have invented certain new and useful Improvements in Power-Transmitting Connections and Adapters, of which the following is a specification, reference being had to the accompanying drawings, forming a part thereof.

The purpose of this invention is to provide an improved device adapted for interposition in a line of power transmission for causing the direction of rotation of the driven shaft to be the same whichever way the driving shaft is rotated. It consists in the elements and features of construction shown and described, as indicated in the claims.

In the drawings:—

Figure 1 is a section axial with respect to the shafts therein which emerge therefrom, of a device embodying this invention.

Figure 2 is a section at the line, 2—2, on Figure 1.

Figure 3 is a section at the line, 3—3, on Figure 2.

Figures 4, 5, 6 and 7 are diagrammatic views showing the four shafts of the device in their relative positions, and diagrammatic presentation of certain of the intermeshing gears on said shaft for indicating the lines of transmission through the trains constituted by said gears respectively in the two directions of rotation of the driving shaft respectively.

The structure shown in the drawings comprises a casing consisting of two identically formed members, 1, 1, adapted to be mounted facing each other so as to combine their cavities into one unitary cavity, in which casing there are journaled and housed the several shafts and gears of the device. Each casing member, 1, has journaled in it protruding accessibly from it a shaft member adapted to be coupled at its accessible end with the shaft of the line in which the device is interposed. In the left hand casing member, 1, there is journaled a shaft, 2, in a bushing journal bearing, 20, which protrudes from the casing member for coupling to the casing of a flexible shaft by means of a coupling sleeve, 21, the shaft, 2, having its accessible end exposed in the counterbore, 20$^a$, formed in the outer end the bushing, 20, said shaft having a male coupling terminal, 2$^a$, for mating with the rotating member of the flexible shaft, whose casing is coupled to the bushing, 20, by the coupling sleeve, 21. In the right hand casing member, 1, there is journaled a shaft, 3, in a journal bearing bushing, 30, which protrudes from the casing and is interiorly threaded at 30$^a$, for engaging the casing member of a flexible shaft, of which the rotated shaft member has a male coupling terminal for engaging a female coupling terminal, 3$^a$, of the exposed or accessible end of the shaft, 3. The inner ends of the shafts, 2 and 3, are reduced in diameter and provided with bushing journal bearings, 2$^b$ and 3$^b$, respectively, in the respective casing members, 1, 1. On the shaft, 2, there are mounted two similar gears, 4 and 5, which have one-way driving clutch connections with the shaft, 2, as shown at 4$^a$ and 5$^a$, said clutch connections being adapted for transmitting rotation in opposite directions, that is, so that when the shaft, 2, is rotated in one direction, it drives the gear, 4, and when it is rotated in the opposite direction, it drives the gear, 5. The clutch device is of familiar form, consisting of the rollers, 4$^a$ and 5$^a$, lodged in furrows formed in the shaft having one face, on which the roller seats and rolls, in the plane of a chord of a limited arc of the circumference of the shaft, and the other face at right angles to such a chord-plane, with a spring $a$, seated on the last mentioned face and reacting upon the roller to thrust it outwardly along the chord-face, the two furrows for the two clutch devices respectively, being at opposite sides of the axis of the shaft, so that the rollers engage the gears in opposite directions of rotation, as stated. In the casing members, 1, 1, there are journaled two counter-shafts, 12, and 13, for whose opposite ends journal bearing bushings, 14, are provided in the two casing members, respectively. Said counter-shafts which are equal in diameter and are equally reduced at their ends for journal bearing, so that the four bushings, 14, are identical in form and dimensions; and the two counter-shafts, 12 and 13, are in precisely similar positions relative to the shafts, 2 and 3, respectively, so that the form of the two casing members, as effected by the position of the journal bearing of the counter-shafts are identical. The two gears, 4 and 5, on the shaft, 2, have each at one end a reduced hub,—4$^b$ and 5$^b$, by which the toothed zones of the two gears are spaced apart along the axis of the shaft, and the right hand gear, 5, is spaced from the bushing, 2$^b$, by a distance sufficient to accommodate between said two gear zones and between the right hand gear, 5, and the casing wall, similarly dimensioned gears on the countershafts, as hereinafter described. On the countershaft, 12, there are mounted for rotation together by securing to each other or to the countershaft, equal gears, 7, 8 and 9, occupying three-fourths of the length of the countershaft between the bearings, and situated with respect to the gears and spaces along the shaft, 2, so that the gear, 7, is accommodated in the space between gears, 4 and 5, the gear, 8, meshes with the gear, 5, and the gear, 9, is accommodated in the space at the right hand of the gear, 5, in the plane of the reduced hub of said gear, 5. On the counter-shaft, 13, there is mounted one double-width gear, 10, meshing with the gear, 7, as to one-half of its width with the gear, 7, and as to the other half with the gear, 4, on the shaft, 2. On the shaft, 3, there is a single gear, 6, which meshes with the gear, 9, on the counter-shaft, 12.

Upon considering the construction described, it will be understood that when the shaft, 2, is rotated in the direction of the arrow on Figure 4, so as to drive the gear, 4, and permit the gear, 5, to idle, rotation will be transmitted through the gear, 4, to the gear, 10, which in turn drives the gear, 7, rotating the counter-shaft, 12, and the gear, 9, thereon, which, meshing with the gear, 6, rotates the latter and the shaft, 3, in the opposite direction from the shaft, 2; and that when the shaft, 2, is driven in the opposite direction, causing the gear, 5, to be rotated and the gear, 4, to idle, the gear, 5, meshing with the gear, 8, rotating the counter-shaft, 12, will cause the gear, 9, thereon, meshing with the gear, 6, on the shaft, 3, to rotate the shaft, 3, in the same direction as that of the shaft, 2, that is to say, in the same direction as it was rotated before when the shaft, 2, was revolving in the opposite direction from that last described.

The two casing members, 1, 1, are secured together by bolts, 15, at the four corners, the two bolts at one end taking through the left hand casing member and being screwed into the right hand member, and the two bolts at the other end taking through the right hand member and being screwed into the left hand member, whereby the two casing members are identically formed as to the provision for holding them together, each having at one end the bolt holes and at the other end the screw engagements for the bolts.

All the gears are removably engaged on their respective shafts so as to be easily removable for the substitution of gears of other dimensions, for varying the speed transmitted from one shaft to the other. With the gears of the dimensions shown, no change of speed is caused in the transmission from shaft, 2, to shaft, 3.

I claim:—

1. A power transmitting connection comprising a housing and two shafts journaled therein and exteriorly accessible for coupling, one shaft having two gears engaged therewith for one-way-driving respectively in opposite directions, the other shaft having a positively carried gear; a countershaft and gear means thereon in driving engagement with the last mentioned gear and with one of the gears on the first mentioned shaft; a second countershaft and gear means thereon in driving engagement with the other gear on the first shaft and also with the gear on the first countershaft; whereby rotation of the first mentioned shaft in either direction produces rotation of the other of said shafts always in the same direction.

2. In combination with a housing having two shafts journaled therein and exteriorly accessible for coupling, one of said shafts having two gears engaged therewith for one-way driving respectively in opposite directions; two gear trains for transmitting rotation for said first shaft to the second, one of said trains comprising one of said gears on the first shaft, and the other train comprising the other of said gears, one of said trains comprising an odd number and the other comprising an even number of gear engagements, the two gears on the first shaft each having their hubs elongated with reduced diameter at one side, and being assembled on the shaft with said elongated hubs at the same side of the gears respectively, whereby clearance is afforded between the gears along the length of the shaft, the transmitting train comprising two counter shafts and gears on one of them which do not mesh with the gears on the first shaft, but are accommodated in the clearances provided by the hubs of said first mentioned gears.

3. In combination with a housing having two shafts journaled therein and exteriorly accessible for coupling, one of said shafts having two gears engaged therewith for one-way driving respectively in opposite directions; two gear trains for transmitting rotation for said first shaft to the second, one of said trains comprising one of said gears on the first shaft, and the other train comprising the other of said gears, one of said trains comprising an odd number and the other comprising an even number of gear engagements, the housing having the opposite journal bearing for the respective shafts spaced apart along the shaft axis a uniform distance substantially equal to four gear-width units, the two gears on the first shaft having reduced hubs alternating with toothed portions, the two trains comprising two countershafts, one of said countershafts having a gear element occupying three consecutive gear width unit spaces along its axis, of which two are in the planes of the two reduced hubs, and the third in the plane of the intermediate gear, the other countershaft having a gear element occupying two consecutive spaces of which one is in the plane of the other gear on the first shaft and intermeshing therewith.

4. In the construction defined in claim 1, foregoing, the housing being parted in a plane transverse to all the shafts, each member of the housing having a journal bearing for each shaft, the gears being removably keyed to their respective shafts, whereby they are interchangeable with differently dimensioned gears for changing the speed transmitted from one shaft to the other through the device.

In testimony whereof, I have hereunto set my hand at Chicago, Illinois, this 2nd day of May, 1922.

FREDERIK G. WHITTINGTON.